Figure 1:
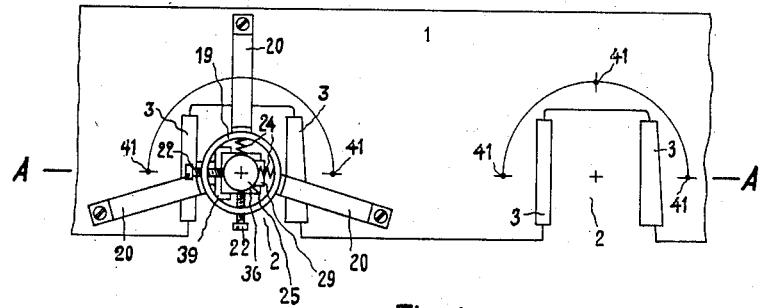

May 1, 1928. 1,667,995

A. STEINLE
DEVICE FOR TESTING THE POSITION OF DRIVING SHAFTS
IN PISTON MACHINES AND THE LIKE
Filed Nov. 27, 1926

Inventor:
Adolf Steinle

Patented May 1, 1928.

1,667,995

UNITED STATES PATENT OFFICE.

ADOLF STEINLE, OF JENA, GERMANY, ASSIGNOR TO THE FIRM: CARL ZEISS, OF JENA, GERMANY.

DEVICE FOR TESTING THE POSITION OF DRIVING SHAFTS IN PISTON MACHINES AND THE LIKE.

Application filed November 27, 1926, Serial No. 151,221, and in Germany December 3, 1925.

When constructing piston machines whose driving parts carry out forward and backward and rotary motions (e. g. steam engines, pumps, gas motors and so on), one has again and again to face the task to test the relative position of the driving shafts. As a rule, two such shafts correlated to each other appertain to a joint plane, i. e. with few exceptions they are either parallel (at a finite or infinitely small distance) or they intersect at an angle of 90°. The present invention relates to a method which especially in the latter case may be used to advantage. This method consists in this that according to the invention by means of a telescope, whose optical axis is denoted by a mark disposed in an image plane and is in a certain definite position relatively to one of the axes to be tested, there is fixed the course of a straight line, which is the connecting line of two points each denoted by a mark and the position of which relatively to another axis is measured, i. e. one constructs with the aid of optical means the requisite position of a second axis (or a straight line which is in simple relation to this requisite position) and ascertains by measurements to be made in an optional manner the deviation of the actual position of the axis from the requisite position. The marks need not be material marks in each base but, on the contrary, it may sometimes be suitable to use as marks optical images of material marks in which case one of the images may lie at a very large distance.

If the one of the axes to be tested be the axis of a boring it is suitable to cause the optical telescope axis to coincide with this axis by inserting the telescope centrically into the boring. With a suitable diameter of the boring the telescope may be inserted directly, while otherwise if a boring having a non-suitable diameter or a solid body (e. g. a pivot or the like) be in question, it is necessary to use intermediate bodies for the support of the telescope. Under certain circumstances, however, it is desirable, when carrying out the test, to be able to deviate the optical telescope axis from that position in which it coincides with or is parallel to the axial direction to be tested. The device can in this case be constructed in such a way that the telescope is so supported in two intermediate bodies, each of which carries three rods, carried out after the type of end gauges and used as struts, that the point of intersection of its optical axis with the circular surface determined by the points of support of the three rods of the one intermediate body is dispaceable in two directions, perpendicular to each other. The said two intermediate bodies may also consist of one piece or an intermediate body, common to both places of bearing, e. g. of tubular shape may on its part be supported on the driving part by means of two separate intermediate bodies.

The construction of the mark carrier should be adapted to the conditions present at any one time. As a rule, it may be assumed that the axis to which the straight line determined by the marks of the mark carrier is to be brought into measurable relation, appertains to a boring, for even if a pivot or solid body of this kind be in question, it is mostly possible to easily use for the test a boring with like axial direction, serving for the bearing of this solid body. It is therefore advisable to impart to the mark-body a tubular shape and to place the straight line, denoted by the two marks, into the tube axis, the tube-walls representing cylindrical surfaces whose surface-lines are parallel to the straight line and may be used as guide lines for the measurement, which can be carried out with the aid of calipers, gauges, feeler gauges and measuring apparatus of this kind.

In many cases it is also desirable to denote on the machine the requisite position of the axial direction, represented by the straight line, in such a way that it may even be easily fixed again after the machine has been working for some time which entails an unavoidable, non-centrical wear of the bearing surfaces. This takes place in the simplest way by disposing circles on the fronts of the bearings with which the connecting line of their centres determines the straight line and therewith the requisite position of the axis. For this purpose it is possible to provide the mark carrier with a marking device which is displaceable about the tube axis and admits of marking at least three points, lying in a plane perpendicular to the straight line and being equidistant from the latter. The marking device may, therefore, e. g. be directly rotatable about the tube or adapted to fit over the tube in various positions rotated relatively to each other about the tube axis.

If the machine contains driving parts, having axial directions parallel to each other and whose test is to be carried out simultaneously, the new invention may also be used to advantage. One has then to operate in such a way that one starts from the requisite position of an axis, ascertained by a previous test, which perpendicularly intersects the one of the two parallel axes, and then tests the second parallel axis relatively to the said requisite position in order to ascertain in this way the errors in the position of the axes parallel to one another.

Figure 2:
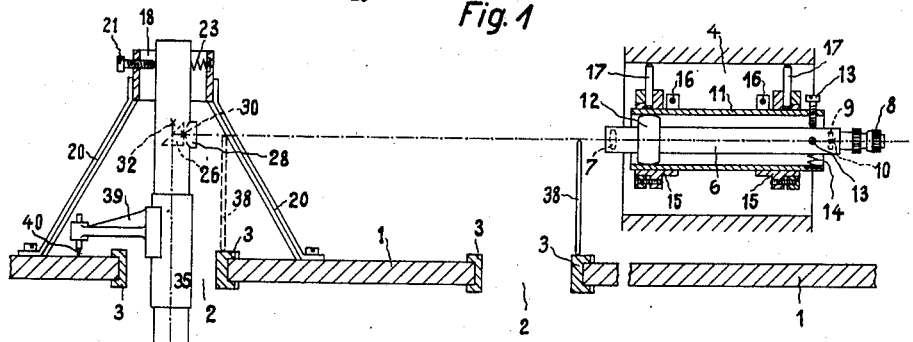
Figure 2:
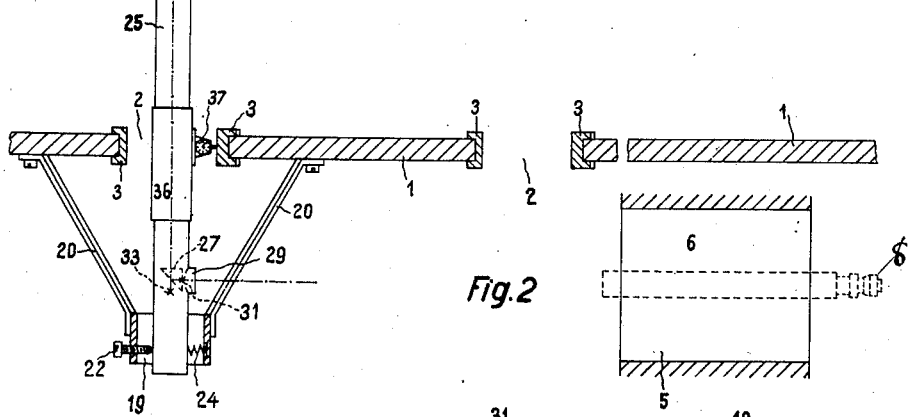
Figure 3:
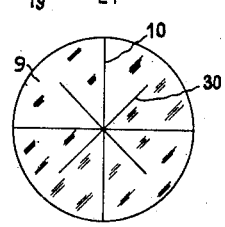
Figure 4:
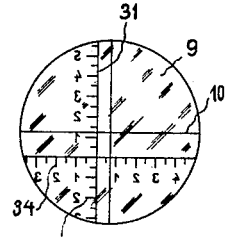
Figure 5:
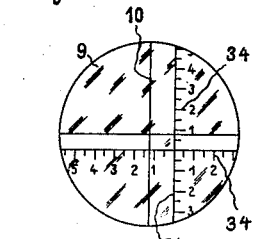

The annexed drawing shows as an example of the invention a device for testing the position of the driving shafts of an engine. Fig. 1 represents a part of the engine-frame with the device in an elevation, Fig. 2 a section on the line A—A of Fig. 1 in a plan. Figs. 3 to 5 show the images seen by the observer in the telescope.

The engine-frame is denoted by 1. It contains recesses 2 for the driving shaft-bearings which are to be inserted with the aid of bearing-checks 3. Outside the frame are disposed the two steam-cylinders 4 and 5. To the testing device appertains a telescope 6 whose optical parts are an objective 7 and an adjustable ocular 8 with a mark-plate 9 disposed in its focal plane. This mark-plate 9 carries cross wires 10 denoting the optical axis of the telescope 6. The latter is supported in a tubular intermediate body 11, on the one hand, by means of a ball-shaped collar 12, on the other hand, on two screws 13 and counter-springs 14 in such a way as to be displaceable by means of the screws 13 about a point of its optical axis in two directions perpendicular to each other. The intermediate body 11 is provided at its ends with two sleeves 15 fixed by means of set-screws 16. In each of the two sleeves 15 there are clamped in corresponding borings three rods 17 carried out after the type of cylindrical end gauges which are radially disposed at an angle of 120° and which support the accurately ground outer surface of the intermediate body 11 relatively to the boring of the cylinder 4.

On the frame 1 are supported on struts 20 in front of the recesses 2 two rings 18, 19. The latter carry, similar to the intermediate body 11, two screws each 21 and 22 respectively, perpendicular to each other, and counter-springs 23 and 24 respectively, which support a tube 25 traversing the recesses 2. In the inside of this tube 25 are located two isosceles-rectangular prisms 26 and 27 opposite to light entrance-tubes 28 and 29 and provided on their outer surfaces with cross wires 30 and 31 which are so disposed that the distance apart of their crossing points corresponds to the distance of the two cylinder axes and that the reflected images 32 and 33 of the crossing points denote the axis of the tube 25. The two branches of the cross wires 31 are provided with longitudinal scales 34.

The tube 25 carries corresponding to the width of the engine-frame 1 two extensions 35 and 36 of square cross section whose surfaces are exactly adjusted to the tube axis. The device is completed by a precision-measuring appliance 37, a correspondingly long gauge 38 and a stop 39, fitting to the extensions 35 and 36, which serves for guiding a marking pin 40 for marking on the frame points 41, which lie on circles concentric with the axis of the tube 25.

Let it be supposed that the cylinders 4 and 5 are horizontally disposed on the engine of the example. When carrying out the test one first adjusts the telescope 6 with the aid of a spirit-level in the position shown in Fig. 2 and gradually focuses it in such a way that the point of the gauge 38 applied at various distances from the objective 7 on the frame 1 or the bearing-checks 3 is sharply imaged on the mark plate 9. If thereby the telescope 6 be displaced with the aid of the horizontal screw 13 until the image of the point of the gauge does not change its lateral position in the field of view in the case of a varying distance of the gauge 38, the optical axis of the telescope 6 is adjusted parallel to the frame 1. The axis of the cylinder 4 will be in its proper position if the optical axis of the adjusted telescope 6 coincides with the axis of the tubular intermediate body 11. If the pitch of the screws 13 be known, it is possible to determine from their position the value of any possible deviations of the cylinder axis from the proper position.

One now adjusts the tube 25, also with the use of a spirit-level, in such a way that the level to be placed transversely to the tube axis upon the surfaces of the extensions 35 and 36 is brought into play whereupon the telescope is adjusted to the cross wires 30. Thereby the perpendicular screws 21 and 22 are destined to compensate aberrations of height of the tube axis relatively to the telescope 6, whilst the lateral adjustment of the cross wires 30 must take place by a displacement of the tube 25 along its axis until the look into the telescope 6 admits of recognizing the image, represented in Fig. 3, in which the crossing points of the cross wires 10 and 30 coincide. After the telescope 6 has been adjusted to the cross wires 31 one will generally obtain the image represented in Fig. 4. If thereupon the tube 25 be displaced with the aid of the screws 22 until the crossing points of both cross wires 10 and 31 also coincide in this image, the tube axis is adjusted to the optical telescope axis. This method is carried through for all recesses 2 of the frame 1 coming into question and it is then possible to prove with the aid of the precision-measuring apparatus 37 inaccuracies of the bearing-cheeks 3 as well as to mark with the marking pin 40 on the frame 1 points 41 by which the exact position of the bearing axes is determined. Thereby, it must of course be supposed that the tube axis has either been placed with the aid of the precision-measuring apparatus 37 and the horizontal screws 21 and 22 exactly into the plane bisecting the interval between the cheeks 3 or that the exact distance of the bearing axis from the cylinder 4 has been fixed in an optional way.

In order to test the axes of the second cylinder 5, it is necessary to insert the telescope 6 with the intermediate body 11 resting upon the rods 17 into this cylinder and to adjust the telescope 6 (in the position shown by dash lines) to the cross wires 31. By means of the linear mark 10 it is possible to read off directly on the scales 34 (Fig. 5) the values of possible deviations of the axis of the cylinder 5 from the correct position if the telescope 6 were so adjusted in the intermediate body 11 that the optical telescope axis was coinciding with the axis of the intermediate body 11.

I claim:

1. Device for testing the relative position of two axes of driving shafts in machines of the kind referred to, comprising a telescope, whose optical axis is denoted by a mark fitted within an image plane of the telescope, means adapted to retain the optical axis of the telescope in a definite position relatively to one of the said two axes, a mark carrier containing two marks lying behind each other, and a measuring device coacting with the said mark carrier and allowing of ascertaining the position of the straight line defined by the said two marks relatively to the other of the said two axes.

2. Device for testing the relative position of two axes of driving shafts in machines of the kind referred to, comprising a telescope, whose optical axis is denoted by a mark fitted within an image plane of the telescope, two intermediate bodies adapted to support the telescope, two sets of three rods, means for connecting each of the said sets with one of the said bodies, means adapted to retain the optical axis of the telescope in a definite position relatively to the said bodies, a mark carrier containing two marks lying behind each other, and a measuring device coacting with the said mark carrier and allowing of ascertaining the position of the straight line defined by the said two marks relatively to another of the axes to be tested.

ADOLF STEINLE.